US009965688B2

(12) United States Patent
Uchida et al.

(10) Patent No.: US 9,965,688 B2
(45) Date of Patent: May 8, 2018

(54) DISPLAY APPARATUS, DISPLAY METHOD, AND STORAGE MEDIUM

(71) Applicant: CANON KABUSHIKI KAISHA, Tokyo (JP)

(72) Inventors: Yumiko Uchida, Kunitachi (JP); Hirotaka Shiiyama, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days. days.

(21) Appl. No.: 15/406,424

(22) Filed: Jan. 13, 2017

(65) Prior Publication Data
US 2017/0206424 A1    Jul. 20, 2017

(30) Foreign Application Priority Data

Jan. 14, 2016  (JP) ................................. 2016-005600

(51) Int. Cl.
| | |
|---|---|
| *G06K 9/00* | (2006.01) |
| *H04N 5/232* | (2006.01) |
| *H04N 5/247* | (2006.01) |
| *H04N 5/262* | (2006.01) |
| *H04N 5/775* | (2006.01) |
| *H04N 7/18* | (2006.01) |
| *G08B 13/196* | (2006.01) |

(Continued)

(52) U.S. Cl.
CPC ..... *G06K 9/00771* (2013.01); *G06K 9/00718* (2013.01); *G06K 9/00765* (2013.01); *G08B 13/196* (2013.01); *H04N 5/23293* (2013.01); *H04N 5/247* (2013.01); *H04N 5/268* (2013.01); *H04N 5/2624* (2013.01); *H04N 5/77* (2013.01); *H04N 5/775* (2013.01); *H04N 7/181* (2013.01)

(58) Field of Classification Search
CPC .......... G06K 9/00771; G06K 9/00718; G06K 9/00765; G08B 13/196; H04N 5/23293; H04N 5/247; H04N 5/2624; H04N 5/268; H04N 5/77; H04N 5/775; H04N 7/181
See application file for complete search history.

(56) References Cited

FOREIGN PATENT DOCUMENTS

| | | |
|---|---|---|
| JP | 2002-373332 A | 12/2002 |
| JP | 3763981 B2 | 4/2006 |
| JP | 2008-097359 A | 4/2008 |

(Continued)

OTHER PUBLICATIONS

Erik Murphy-Chutorian, et al., Head Pose Estimation for Driver Assistance Systems: A Robust Algorithm and Experimental Evaluation; Proceedings of the 2007 IEEE Intelligent Transportation Systems Conference, pp. 709-714.

*Primary Examiner* — Huy T Nguyen
(74) *Attorney, Agent, or Firm* — Canon U.S.A., Inc. IP Division

(57) ABSTRACT

A display apparatus includes a display unit configured to display in a plurality of display areas the video images of a first group out of the plurality of the video images input by the input unit and then to switch them to video images of a second group out of the plurality of the video images to produce display in a plurality of the display areas, a detection unit configured to detect objects in each video image, and a control unit configured to, in a case where the number of the objects detected in respective video images of the first group by the detection unit is equal to or greater than a first predetermined number, control the display unit to make the display time of the video image of the first group longer than a predetermined display time for displaying other video images of the first group.

16 Claims, 17 Drawing Sheets

(51) Int. Cl.
*H04N 5/268* (2006.01)
*H04N 5/77* (2006.01)

(56) References Cited

FOREIGN PATENT DOCUMENTS

| | | |
|---|---|---|
| JP | 2010-165156 A | 7/2010 |
| JP | 4905761 B2 | 3/2012 |
| JP | 2014-093023 A | 5/2014 |

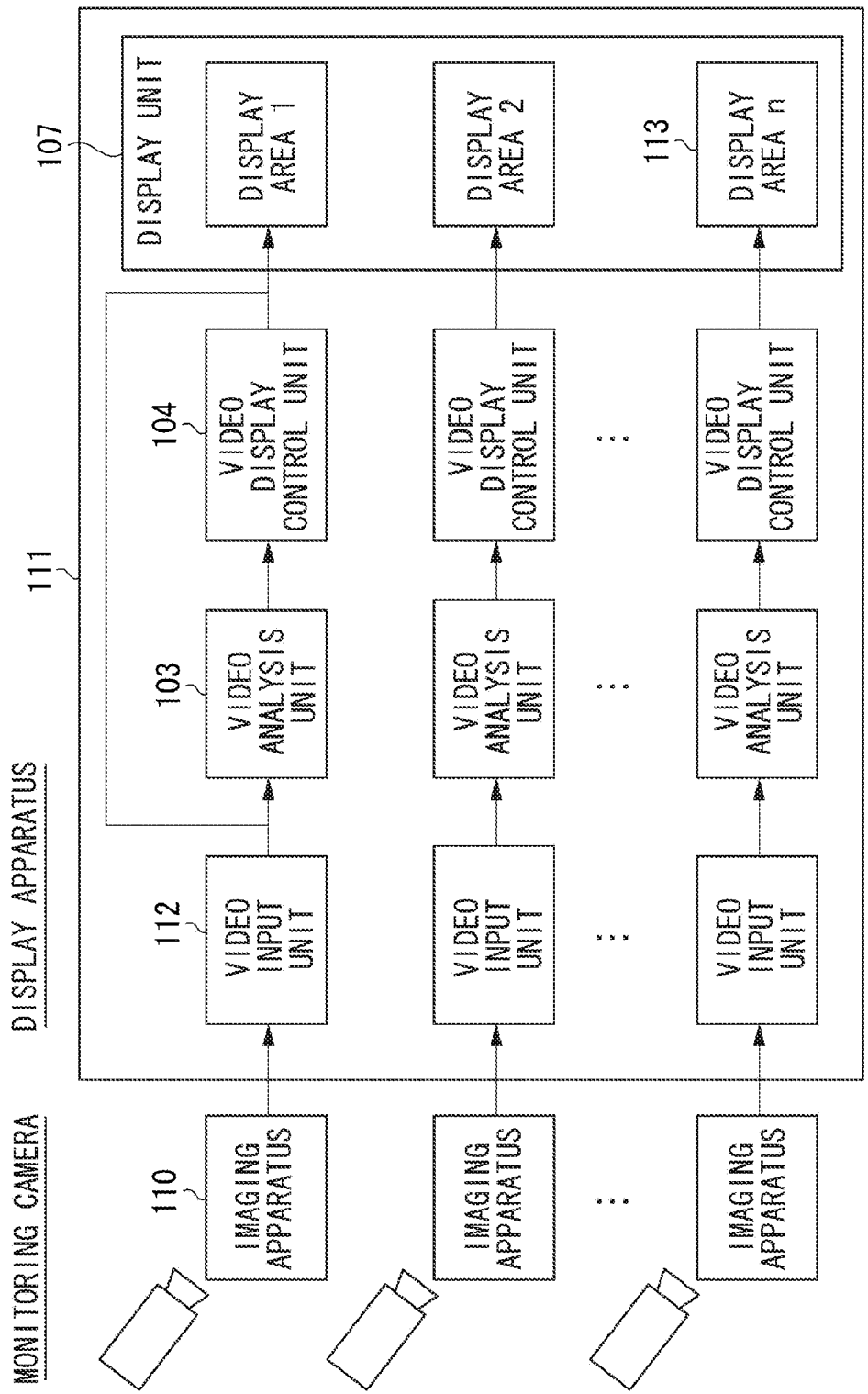

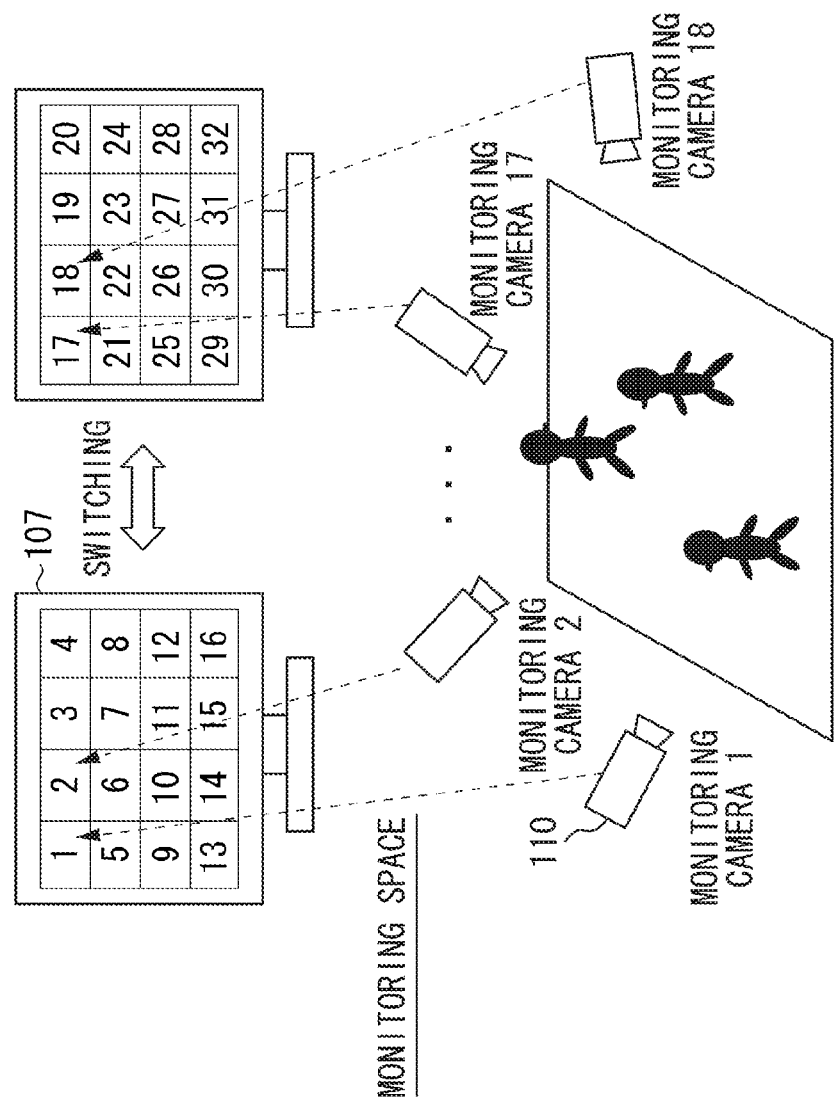

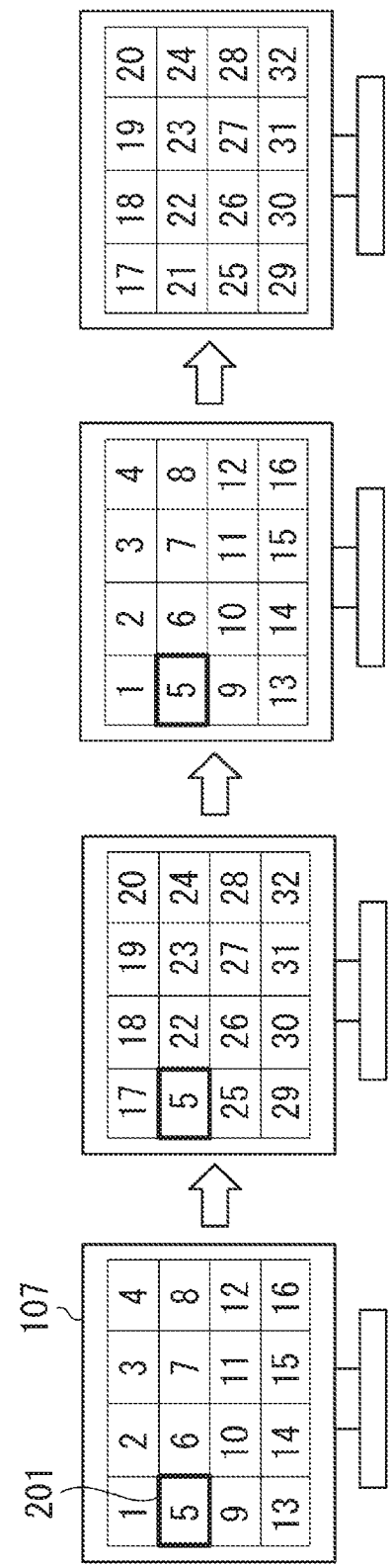

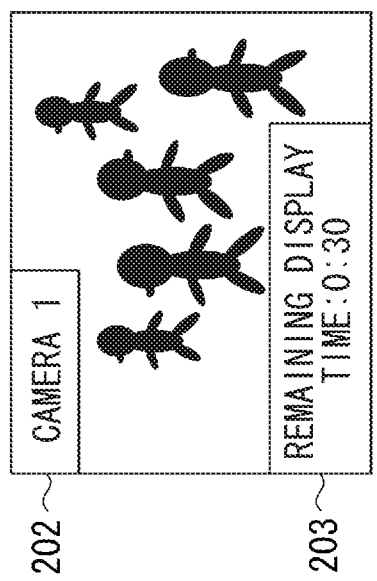

FIG. 3A

IMAGING APPARATUS DATA

| CAMERA ID | INSTALLATION LOCATION |
|---|---|
| Camera 001 | (300, 600), DIRECTED TO NORTH |
| Camera 002 | (320, 610), DIRECTED TO NORTHWEST |
| Camera 003 | (400, 610), DIRECTED TO SOUTH |
| ⋮ | ⋮ |
| Camera 0017 | (800, 300), DIRECTED TO WEST |
| Camera 0018 | (860, 350), DIRECTED TO SOUTH |
| ⋮ | ⋮ |

301 = CAMERA ID, 302 = INSTALLATION LOCATION

FIG. 3B

DISPLAY LAYOUT DATA

| CAMERA ID | VIDEO DISPLAY POSITION | DISPLAY PATTERN |
|---|---|---|
| Camera 001 | DISPLAY AREA 1 | PATTERN 1 |
| Camera 002 | DISPLAY AREA 2 | PATTERN 1 |
| Camera 003 | DISPLAY AREA 3 | PATTERN 1 |
| ⋮ | ⋮ | ⋮ |
| Camera 0017 | DISPLAY AREA 1 | PATTERN 2 |
| Camera 0018 | DISPLAY AREA 2 | PATTERN 2 |
| ⋮ | ⋮ | ⋮ |

301 = CAMERA ID, 303 = VIDEO DISPLAY POSITION, 304 = DISPLAY PATTERN

FIG. 3C

VIDEO ANALYSIS DATA

| CAMERA ID | NUMBER OF PERSONS | AVERAGE PERSON SIZE | VISUAL RECOGNITION DIFFICULTY |
|---|---|---|---|
| Camera 001 | 1 | 10cm | 0 |
| Camera 002 | 6 | 8cm | 1 |
| Camera 003 | 10 | 3cm | 7 |
| ⋮ | ⋮ | ⋮ | ⋮ |

FIG. 3D

DISPLAY CONTROL DATA

| CAMERA ID | DISPLAY TIME | DISPLAY START TIME |
|---|---|---|
| Camera 001 | 1 MINUTE | 09:05:30 |
| Camera 002 | 1.5 MINUTES | 09:05:30 |
| Camera 003 | 4.5 MINUTES | 09:01:30 |
| ⋮ | ⋮ | ⋮ |

FIG. 3E

DISPLAY APPARATUS SETTING DATA

```
MINIMUM DISPLAY TIME: 10 SECONDS
NORMAL DISPLAY TIME: 1 MINUTE
MAXIMUM DISPLAY TIME: 5 MINUTES
UPPER LIMIT OF NORMAL NUMBER OF PERSONS: 5 PERSONS
LOWER LIMIT OF NORMAL NUMBER OF PERSONS: 2 PERSONS
LOWER LIMIT OF NORMAL PERSON SIZE: 300 PIXELS
UPPER LIMIT OF NORMAL PERSON SIZE: 900 PIXELS
```

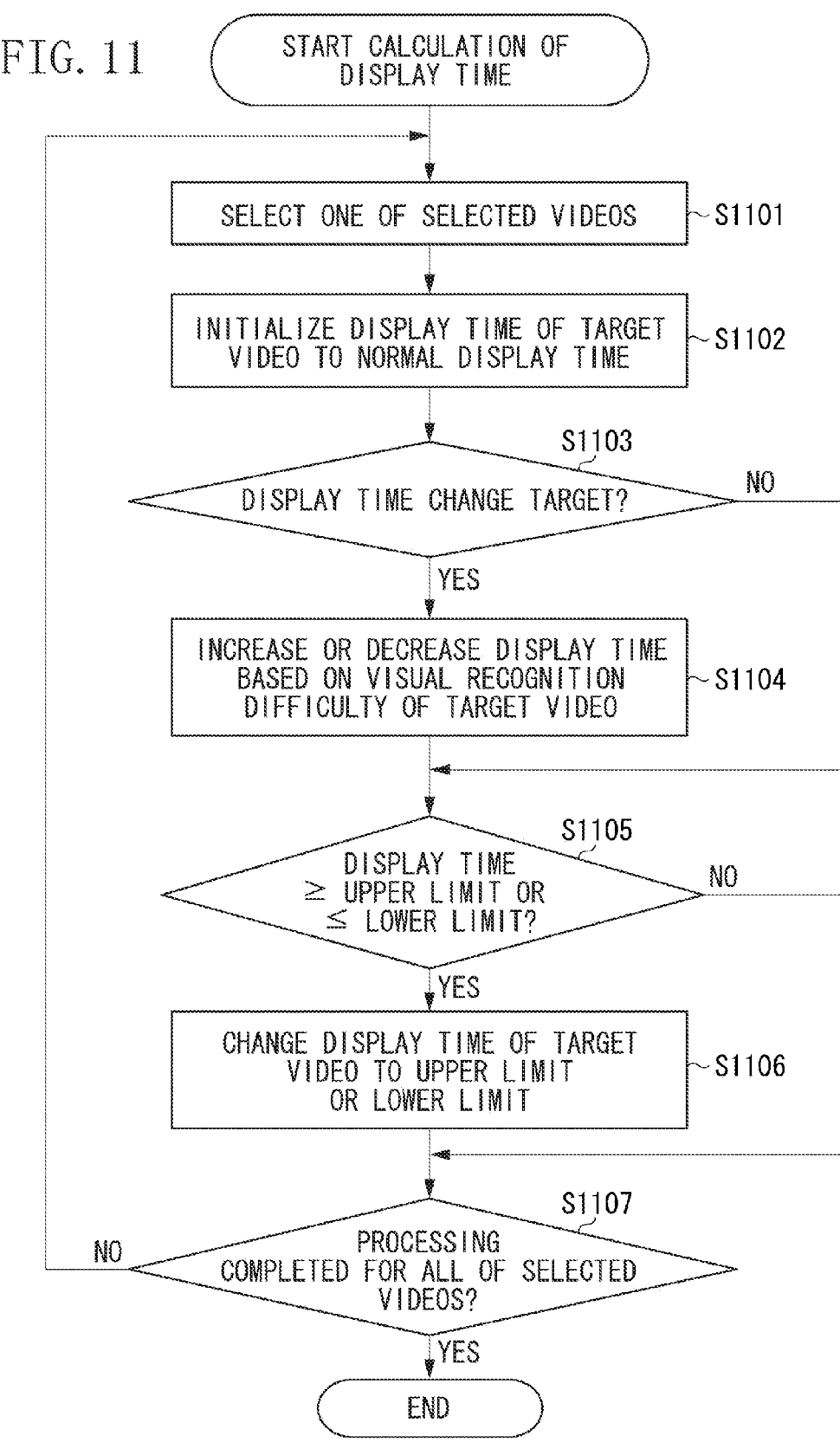

DISPLAY APPARATUS, DISPLAY METHOD, AND STORAGE MEDIUM

BACKGROUND

Field of the Disclosure

The present disclosure relates to a display apparatus for displaying monitor video.

Description of the Related Art

With the increase in the use of monitoring cameras in recent years, the need for efficiently monitoring video images of many monitoring cameras is also increasing. To monitor the video of many monitoring cameras, it is common to simultaneously display a plurality of video images of monitoring cameras, for example, by dividing the monitor area of one monitor into a plurality of areas or arranging a plurality of monitors. However, when there are many monitoring cameras, video images of all the cameras cannot be simultaneously displayed on the monitor, therefore it is necessary to display video images on the monitor by switching them.

As a method for switching video images displayed on the monitor, it is common to collectively switch video display thereon at intervals of a fixed display time. However, the video images of a plurality of monitoring cameras include both of video images which require time for a monitoring person to grasp contents and video images which do not require monitoring time. For example, in a case where motions of persons and objects are carefully monitored, the video image showing many captured images of persons and objects requires much time to grasp contents in accordance with the number of persons and objects.

When the person size is small in the video image, many shielding objects are present, or the brightness is low, more careful monitoring is required, which causes the monitoring person to take much time to grasp video contents. On the other hand, video which is not picking an image of person does not require much time to grasp the contents. In this case, in a general display switching method, the video which requires time for a monitoring person to grasp the contents and the video which does not require time to grasp the contents may be displayed in the same time, and video display is switched before the monitoring person completely grasps the contents of each video image.

U.S. Pat. No. 3,763,981 and U.S. Pat. No. 4,905,761 discuss techniques related to a method for switching display of a plurality of video images. U.S. Pat. No. 3,763,981 discusses a method for prolonging the display time according to the degree of a temporal change of each video image in a display apparatus which is configured to display a plurality of monitor video images one after another within one area.

U.S. Pat. No. 4,905,761 is related to a system for displaying still images on a frame basis indicating temporal changes of a video image captured by one monitoring camera in a plurality of divided areas on one monitor. U.S. Pat. No. 4,905,761 discusses a technique for determining whether the change of the video is occurring in any frame image when switching the display target frame and, if the change is occurring, continues display of frames captured before the change to enable comparison between frames captured before and after the change.

The technique discussed in U.S. Pat. No. 3,763,981 prolongs the display time of a video image showing a major change, and therefore as its effect the monitoring person does not easily overlook the change in the video. However, this technique displays one video image in one area. Therefore, when there are many monitoring cameras, this technique is unable to simultaneously monitor video images of a plurality of monitoring cameras. The technique discussed in U.S. Pat. No. 4,905,761 simultaneously displays video images before and after the change has occurred, therefore as its effect the monitoring person can easily grasp changes in the video image. However, this technique can handle video images of only one monitoring camera and therefore is not capable of simultaneously monitoring video images of many monitoring cameras.

The techniques in U.S. Pat. No. 3,763,981 and U.S. Pat. No. 4,905,761 do not switch video images of a plurality of monitoring cameras to display them and therefore are not capable of supporting a situation where many monitoring cameras are operating. Although the techniques in U.S. Pat. No. 3,763,981 and U.S. Pat. No. 4,905,761 perform control by switching display according to the change amount of a video image, these techniques cannot take into consideration various factors which have an influence when grasping video contents such as the number of persons and objects and person size. Therefore, these techniques cannot control video display according to the visibility of video images.

SUMMARY

The present disclosure is directed to facilitating grasping of video contents displayed on a display apparatus which shows video images of a plurality of monitoring cameras, by switching them, while differentiating the display time of video images depending on factors which have an influence when grasping the video contents.

According to an aspect of the present disclosure, a display apparatus includes, an input unit configured to input a plurality of video images captured by a plurality of imaging apparatuses, a display unit configured to display in a plurality of display areas the video images of a first group out of the plurality of the video images input by the input unit and then switch them video images of a second group out of the plurality of the video images to produce display in a plurality of the display areas, a detection unit configured to detect objects in each video image, and a control unit configured to, in a case where the number of the objects detected in respective video images of the first group by the detection unit is equal to or greater than a first predetermined number, control the display unit to make the display time of the video image of the first group longer than a predetermined display time for displaying other video images of the first group.

Further features of the present disclosure will become apparent from the following description of exemplary embodiments with reference to the attached drawings.

BRIEF DESCRIPTION OF THE DRAWINGS

FIG. 1B is a block diagram illustrating a functional configuration according to one or more aspects of the present disclosure and FIG. 1C is a block diagram illustrating a functional configuration of a video analysis unit.

FIG. 2A illustrates basic display switching processing according to one or more aspects of the present disclosure, FIG. 2B illustrates display switching processing when there is a video image which presents great difficulty in visual recognition, and FIG. 2C illustrates one display area.

FIG. 3A illustrates data related to an imaging apparatus, FIG. 3B illustrates data related to display layout, FIG. 3C illustrates data related to video analysis, FIG. 3D illustrates data related to display control, and FIG. 3E illustrates data related to system settings.

FIG. 11 is a flowchart illustrating processing for calculating a display time according to one or more aspects of the present disclosure.

DESCRIPTION OF THE EMBODIMENTS

Exemplary embodiments will be described in detail below with reference to the accompanying drawings.

Figure 1A:
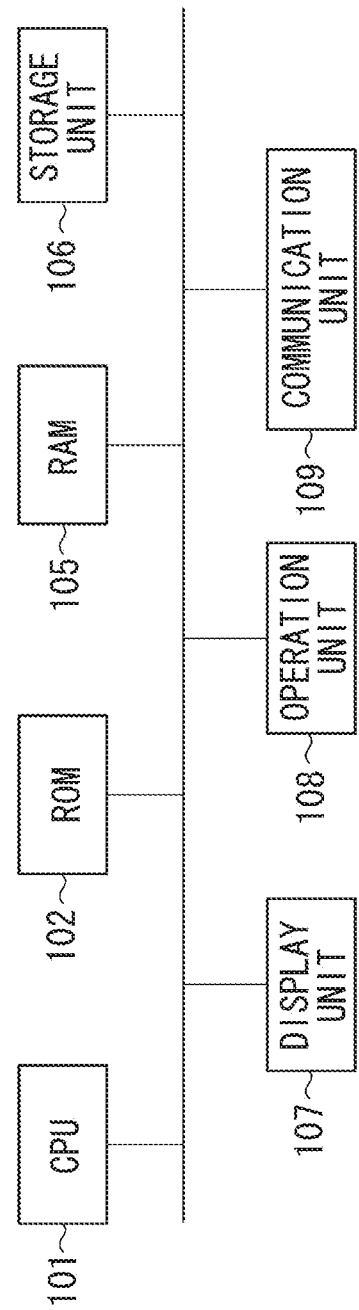
FIG. 1A is a block diagram illustrating an example of a hardware configuration according to one or more aspects of the present disclosure.

FIG. 1A illustrates a hardware configuration of a monitor video display apparatus according to a first exemplary embodiment. A central processing unit (CPU) 101 controls the entire apparatus by executing a control program stored in a read only memory (ROM) 102. The control program stored in the ROM 102 implements the function of a video analysis unit 103 and a video display control unit 104 (described below). A random access memory (RAM) 105 temporarily stores various data from each component, and is used to load a program so that the CPU 101 can execute it.

A storage unit 106 stores processing target data according to the present exemplary embodiment. A flash memory, a hard disk drive (HDD), and a digital versatile disc random access memory (DVD-RAM) can be used as a medium of the storage unit 106. A display unit 107 is composed of a liquid crystal panel and displays processing target data according to the present exemplary embodiment. The display unit 107 may include one or a plurality of display devices. An operation unit 108 includes operation buttons, a touch panel, etc., and receives an instruction from a user. For example, the user is able to issue an instruction for switching video display via the operation unit 108. A communication unit 109 enables the display apparatus to communicate with other apparatus such as a monitoring camera.

FIG. 1B is a block diagram illustrating a functional configuration of a display apparatus 111 according to the present exemplary embodiment. In the display apparatus 111, a video input unit 112 inputs monitor video captured by an externally installed imaging apparatus 110 such as a monitoring camera, and a video analysis unit 103 analyzes the input video. The video analysis unit 103 detects a monitoring target object represented by a person, counts the number of objects, and calculates the visual recognition difficulty which indicates the difficulty in grasping contents of the monitor video. The monitoring target object may be a person or a vehicle. The present exemplary embodiment will be described below as an example case where the monitoring target object is the person.

Figure 1C:
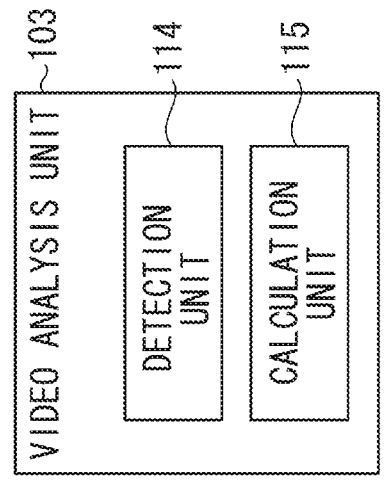

The video analysis unit 103 according to the present exemplary embodiment includes a detection unit 114 and a calculation unit 115 as illustrated in FIG. 1C. The detection unit 114 included in the video analysis unit 103 detects the number, sizes, density, and moving speeds of objects. When an object is a person, the detection unit 114 can further detect the face direction of the person. The calculation unit 115 included in the video analysis unit 103 calculates the visual recognition difficulty.

Based on the result of the analysis by the video analysis unit 103, the video display control unit 104 sets the display time of each video image, controls a monitor video display method, and displays the video in a display area 113 in the display unit 107. The video display control unit 104 can include a calculation unit (not illustrated). The calculation unit included in the video display control unit 104 calculates the display time and the remaining display time.

While, in the present exemplary embodiment, the display unit 107 includes one display device (monitor) displaying display areas 113 that divide the display area of the monitor, the configuration of the display unit 107 is not limited thereto. When the display unit 107 includes a plurality of display devices, each of a plurality of the display areas 113 on the display unit 107 can be associated with the display area of each display device.

Each of the display areas 113 is assigned a plurality of display target monitoring video images of the imaging apparatuses 110 in advance, and switching of display is sequentially performed based on an instruction of the video display control unit 104. Processing of the video analysis unit 103 and the video display control unit 104 is performed in parallel, for each display area 113.

Processing for each step of flowcharts according to the present exemplary embodiment may be implemented by software executed by the CPU 101 or by hardware such as an electronic circuit.

FIGS. 2A, 2B, and 2C illustrate overview of display processing according to the present exemplary embodiment. FIG. 2A illustrates a relation between respective monitoring cameras and the display apparatus 111 for displaying video images of the monitoring cameras, and basic display switching. In the monitoring space, a plurality of monitoring cameras is installed as the imaging apparatuses 110 to capture persons in the monitoring space. The monitoring cameras may be capturing the same place from different directions or capturing different places. A monitor (display device) corresponding to the display unit 107 is installed in another place.

The monitor is divided into 16 display areas 113 which respectively display video images of different monitoring cameras. Up to 16 video images can be displayed at the same time. Therefore, when more than 16 monitoring cameras are installed in the monitoring space, switching of video display is performed after the video images of some monitoring cameras are displayed for a predetermined time period (at intervals of a predetermined display time). For example, when 32 cameras are installed, the first to the 16th imaging apparatuses 110 are grouped into one group, and the 17th to the 32nd imaging apparatuses 110 are grouped into another group. There are two different display patterns which are alternately switched and displayed. One display pattern displays the video images of the first to the 16th imaging apparatuses 110 of one group, and the other display pattern displays the video images of the 17th to the 32nd imaging apparatuses 110 of the other group.

FIG. 2B illustrates display switching on the display unit 107 when a monitoring camera captures a video image which presents great difficulty in visual recognition. In this case, a monitoring camera 5 is capturing the video image which presents great difficulty in visual recognition, and the display time of the video image of the monitoring camera 5 is prolonged to exceed the normal display time (predetermined display time) to ensure an enough time period for the monitoring person to confirm the video.

While, in this example, the display time of the video of the monitoring camera 5 is prolonged three times as much as the normal display, the length of the prolonged time can be appropriately changed depending on the visual recognition difficulty. After a predetermined time has elapsed, the display areas 113 other than the one for the monitoring camera 5 are switched but the video display area 113 for the monitoring camera 5 is not switched, i.e., the video in this display area remains displayed at the same position while prolonging the display time. In many cases, a person monitoring the cameras habitually remembers the places where video images are captured. Therefore, the video images can be displayed without giving a sense of strangeness if the layout of the display areas 113 is not changed other than the one for the monitoring camera 5.

When the prolonged display time of the monitoring camera 5 has elapsed, the display area 113 of the monitoring camera 5 returns to the normal display, i.e., displays the video of the monitoring camera 21. The display area 113 for the video of the monitoring camera 5 is supplied with a frame 201 to allow the monitoring person to easily notice that the display time has been prolonged.

FIG. 2C illustrates one display area 113. Camera identification information 202 and a remaining display time 203 are displayed together with each monitor video. Therefore, the monitoring person is able to notice to which camera each video image belongs and the remaining display time until the current video is switched to following video. The user can also issue an instruction for switching video display and an instruction for prolonging the display time via the operation unit 108.

FIGS. 3A to 3E illustrate data formats handled by the display apparatus 111. FIG. 3A illustrates the data format for storing information about the imaging apparatuses 110, more specifically, a camera identifier (ID) 301 and an installation location 302 for identifying the imaging apparatuses 110.

FIG. 3B illustrates data related to the display layout of the display unit 107. A video display position 303 indicates an area of the display unit 107 where the video of each imaging apparatus 110 is displayed in. A display pattern 304 indicates the order of video display within the same display area 113.

FIG. 3C illustrates data indicating the result of analyzing the video obtained from each imaging apparatuses 110 by the video analysis unit 103. The data stores the number of persons 305 captured within the video image, an average person size 306, and visual recognition difficulty 307 calculated based on these pieces of information. FIG. 3D illustrates data related to display control of each video image which is updated by the video display control unit 104. In this case, the data stores a display time 308 and a display start time 309 for each video image.

FIG. 3E illustrates data related to settings of the display apparatus 111. The data stores switching time of normal video display, the maximum display time (permissible time) in case of prolonging the display time, the parameters (setting values) used to calculate the visual recognition difficulty and the like. FIG. 3E illustrates 300 and 900 pixels as examples of lower limit and upper limit values of the normal person size displayed on the display unit 107. These parameters vary depending on the resolution of the display apparatus 111 and can be arbitrarily changed by the user.

Figure 4:
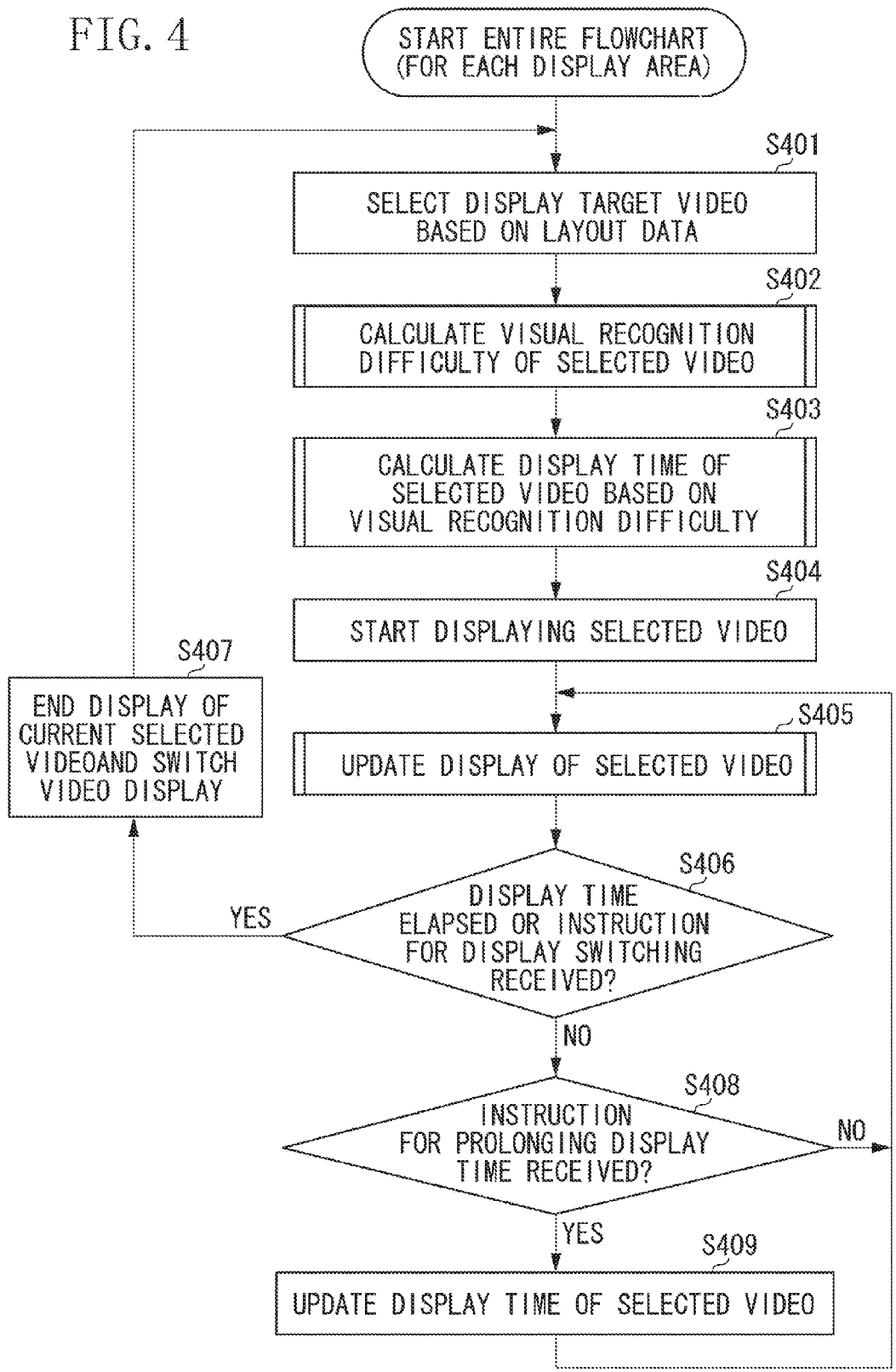
FIG. 4 is a flowchart illustrating overall control according to one or more aspects of the present disclosure.

The above-described operations will be described below with reference to flowcharts. FIG. 4 is a flowchart illustrating overall control of the display apparatus 111. This flowchart is executed in parallel for each of the display areas 113 on the display unit 107. In step S401, the video display control unit 104 selects display target video based on the display layout data illustrated in FIG. 3B.

In the present case, referring to the display layout data, the video display control unit 104 selects one video image according to the order of the display pattern 304 from among the processing target video images for which the display area 113 processed through the flowchart is set in the video display position 303.

In step S402, the calculation unit 115 included in the video analysis unit 103 calculates the visual recognition difficulty of the video selected in step S401. A method for calculating the visual recognition difficulty will be described in detail below with reference to FIG. 5. In step S403, the video display control unit 104 calculates the display time of the selected video based on the visual recognition difficulty calculated in step S402. A calculation unit (not illustrated) included in the video display control unit 104 may calculate the display time of the selected video. A method for calculating the display time will be described in detail below with reference to FIG. 6.

In step S404, the video display control unit 104 instructs the display unit 107 to start displaying the selected video. In step S405, the video display control unit 104 instructs the display unit 107 to update the displayed video. In step S405, based on the elapsed display time, the display unit 107 changes the video display format (described in detail below with reference to FIG. 7).

In step S406, the video display control unit 104 determines whether the predetermined display time calculated in step S405 has elapsed or an instruction for switching video display is issued from the user. If the video display control unit 104 determines that the predetermined display time has elapsed, so that the display has been carried out in the predetermined time, or that an instruction for switching video display has been issued from the user (YES in step S406), the processing proceeds to step S407. In step S407, the display unit 107 ends displaying the current selected video and switches the display target to the video to be selected next in step S401.

On the other hand, if the video display control unit 104 determines neither that the display time has elapsed nor that an instruction for switching video display has been issued from the user (NO in step S406), then in step S408, the video display control unit 104 determines whether an instruction for prolonging the display time of the current selected video is issued from the user. When an instruction for prolonging the display time is not issued from the user (NO in step S408), the processing returns to step S405. On the other hand, when an instruction for prolonging the display time is issued from the user (YES in step S408), then in step S409, the video display control unit 104 updates the display time of the selected video. Then, the processing returns to step S405, and the video display control unit 104 repeats the above-described processing. The processing for determining the presence or absence of a user instruction in steps S406 and S408 is not essential, and may be omitted. This flowchart is repetitively executed during execution of software and is ended when software ends or an operation of the apparatus pauses.

Figure 5:
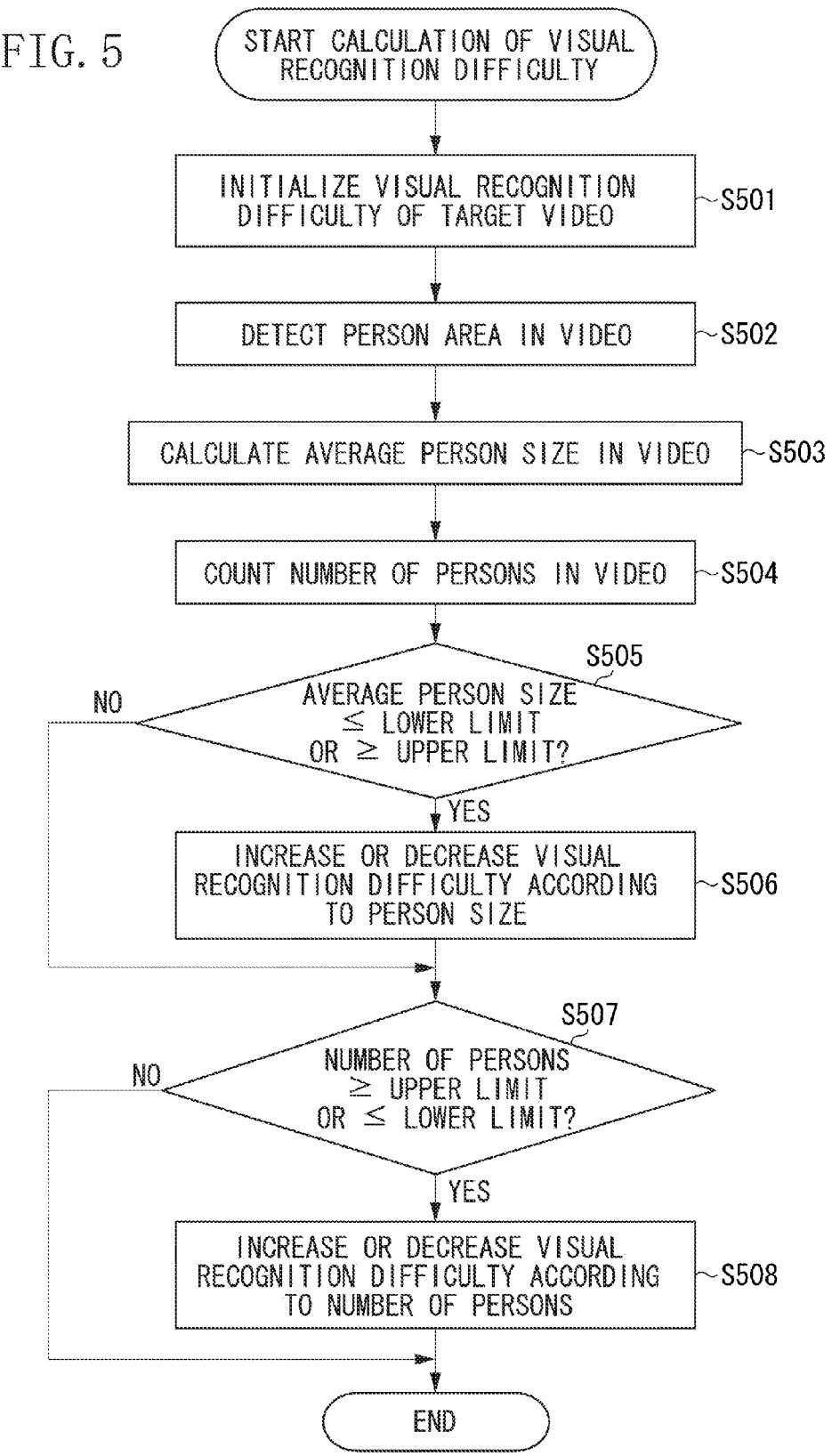
FIG. 5 is a flowchart illustrating processing for calculating visual recognition difficulty according to one or more aspects of the present disclosure.

FIG. 5 is a flowchart illustrating the calculation of the visual recognition difficulty performed by the calculation unit 115 included in the video analysis unit 103. In step S501, the calculation unit 115 initializes the visual recognition difficulty of the video selected as a processing target of this flowchart. In step S502, the detection unit 114 detects person areas within the selected video image. A known technique such as the technique for extracting person's contour areas discussed in Japanese Patent Application Laid-Open No. 2008-97359 can be used to detect the person area.

In step S503, the calculation unit 115 calculates the average size of the person areas in the video image. When the detection unit 114 detects person areas in step S502, the size of each person area can be acquired. Therefore, the calculation unit 115 calculates the average size of the person areas in step S503. In this case, the size of a person area may be either the area of the person area or the approximate height of the person area in the vertical direction. According to the present exemplary embodiment, the size of a person area is represented by the maximum number of pixels of the person area in the vertical direction as the height of the person area in the vertical direction. In step S504, the calculation unit 115 counts the number of person areas in the video detected by the detection unit 114 in step S502.

In step S505, the video analysis unit 103 determines whether the average person size in the video calculated in step S503 is equal to or smaller than a lower limit of the person size (a first predetermined size) predetermined as illustrated in FIG. 3E. When the average person size is equal to or smaller than the lower limit of the person size (YES in step S505), then in step S506, the calculation unit 115 increases the visual recognition difficulty of the selected video. As a method for increasing the visual recognition difficulty, the calculation unit 115 may increase the visual recognition difficulty in proportion to the difference between a predetermined person size and the calculated average person size. Instead of the average person size in the video, the minimum size (minimum value) may be used as a reference for the calculation of the visual recognition difficulty. In this case, if at least one person is captured in a small size, the display time can be prolonged in order to reduce the possibility of overlooking. The video analysis unit 103 also determines whether the average person size in the video calculated in step S503 is equal to or greater than an upper limit of the person size (a second predetermined size) predetermined as illustrated in FIG. 3E. When the average person size is equal to or greater than the upper limit of the person size (YES in step S505), then in step S506, the calculation unit 115 decreases the visual recognition difficulty of the selected video. The method for decreasing the visual recognition difficulty is similar to the method for increasing the visual recognition difficulty, and the redundant description thereof will be omitted.

In step 3507, the video analysis unit 103 determines whether the number of persons in the video detected in step S504 is equal to or greater than an upper limit of the number (a first predetermined number) predetermined as illustrated in FIG. 3E. When the number of persons is equal to or greater than the upper limit of the number (YES in step S507), then in step S508, the calculation unit 115 increases the visual recognition difficulty of the selected video. As a method for increasing the visual recognition difficulty, for example, the visual recognition difficulty can be increased in proportion to the difference between a predetermined number of persons and the calculated number of persons. The video analysis unit 103 also determines whether the number of persons in the video detected in step S504 is equal to or smaller than the lower limit of the number of persons (equal to or smaller than a second predetermined number) predetermined as illustrated in FIG. 3E. When the number of persons is equal to or smaller than the lower limit of the number of persons (YES in step S507), then in step S508, the calculation unit 115 decreases the visual recognition difficulty of the selected video. The method for decreasing the visual recognition difficulty is similar to the method for increasing the visual recognition difficulty, and the redundant description thereof will be omitted.

The person sizes, the number of persons, and the visual recognition difficulty calculated in this flowchart are recorded in the video analysis data illustrated in FIG. 3C.

Although, in the present embodiment, the visual recognition difficulty is calculated based on the number of persons and the person sizes in the video, either one of the number of persons or the person sizes may be used. Further, the visual recognition difficulty may be calculated based on at least any one of the density of persons, moving speeds of persons, image shake of persons, face directions of persons, shield condition of persons, and brightness of the video.

In these cases, it is possible to prolong the display time when the video contents are difficult to grasp because of such factors as high density of persons, image shake of persons, many shielding objects, sideways directions of the face, and video darkness. On the contrary, it is possible to shorten the display time when the video contents are easy to grasp because the number of persons is small, there is no shake of persons, no shielding objects, face directions of persons are forward, or the video is bright.

The density of persons can be calculated based on the result of person detection. A known technique can be used to calculate the moving speeds of persons, the image shake of persons, the face directions of persons, shield condition of persons, and the brightness of the video. For example, the moving speed of a person can be determined by the value of motion vectors obtained by using the person tracking technique discussed in Japanese Patent Application Laid-Open No. 2002-373332. The shake of a person is caused, for example, by the moving speed of the person when a video image is captured at a low shutter speed in a case where an imaging apparatus is in a dark place. The frequency component of a person detection area can be used to calculate the image shake. More specifically, based on the obtained ratio of the low-frequency and the high-frequency components, the shake can be determined when the ratio of the low-frequency component exceeds a predetermined value.

As a method for detecting the face direction of a person, the known technique discussed in Erik Muphy-Chutorian, "Head pose estimation for driver assistance systems: A robust algorithm and experimental evaluation," in Proc. IEEE Conf. Intelligent Transportation Systems, 2007, pp. 709-714 may be used. For example, the known technique for extracting a Histogram of Oriented Gradient (HOG) and estimating the face direction with SVR is used. The method discussed in Japanese Patent Application Laid-Open No. 2014-93023 can be used to determine the shield condition. The technique discussed in Japanese Patent Application Laid-Open No. 2014-93023 determines the shield condition by dividing an object into a plurality of partial areas and scoring the likeness to the target object for each partial area. For the brightness of the video, luminance information extracted by the face detection method discussed in Japanese Patent Application Laid-Open No. 2010-165156 can be used.

Figure 6:
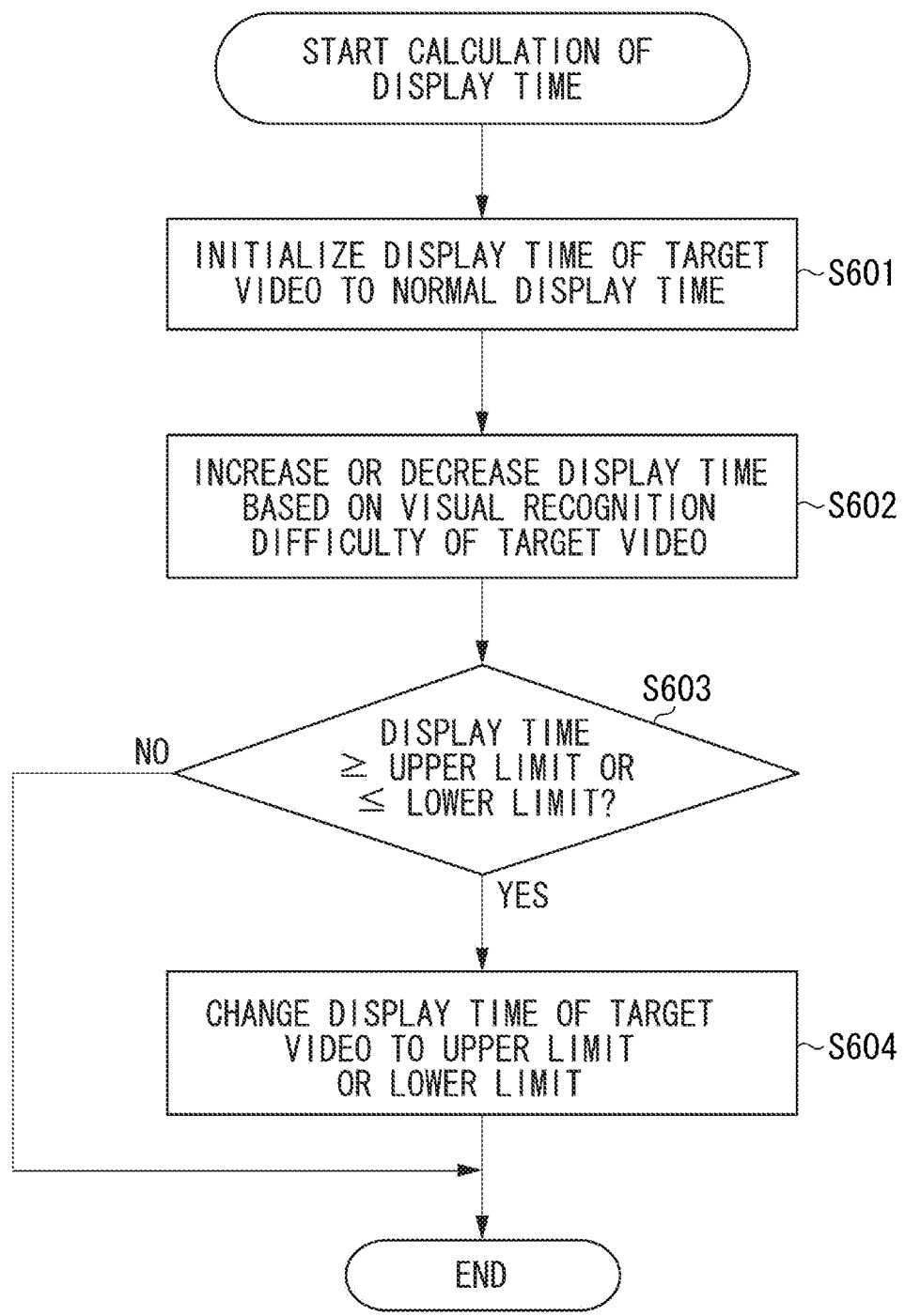
FIG. 6 is a flowchart illustrating processing for calculating a display time according to one or more aspects of the present disclosure.

FIG. 6 is a flowchart illustrating processing for calculating the display time of the selected video which is performed by the video display control unit 104. This calculation processing may be performed by a calculation unit (not illustrated) included in the video display control unit 104.

In step S601, the video display control unit 104 initializes the display time of the selected video as a processing target for this flowchart to be the normal display time predetermined as illustrated in FIG. 3E. The normal display time is a fixed display time for displaying the selected video for a predetermined time period. In step S602, the video display control unit 104 increases or decreases the display time based on the level of the visual recognition difficulty of the video. This processing can be achieved, for example, by adding or subtracting the visual recognition difficulty multiplied by a constant to/from the normal display time.

In step S603, the video display control unit 104 determines whether the display time calculated in step S602 is greater than the maximum display time (upper limit) which is predetermined as illustrated in FIG. 3E. When the video display control unit 104 determines that the display time calculated in step S602 is greater than the maximum display time (upper limit) (YES in step S603), then in step S604, the video display control unit 104 corrects the display time of the processing target video to be the maximum display time (upper limit). Further, the video display control unit 104 may determine whether the display time calculated in step S602 is smaller than the minimum display time (lower limit) predetermined as illustrated in FIG. 3E. When the video display control unit 104 determines that the display time calculated in step S602 is smaller than the minimum display time (lower limit) (YES in step S603), then in step S604, the video display control unit 104 corrects the display time of the processing target video to be the minimum display time (lower limit). By setting the maximum and the minimum display times (upper limit and lower limit) in this way, a specific display area can be prevented from being occupied by one video image and the display time of a specific video image can be prevented from being too short.

The display time of the selected video calculated in this flowchart is recorded in the display control data illustrated in FIG. 3D. Upon completion of this flowchart, step S404 in the flowchart illustrated in FIG. 4 is executed and video display by the display unit 107 is started. At this time, the display start time of the video is recorded in the display start time 309 illustrated in FIG. 3D.

Figure 7:
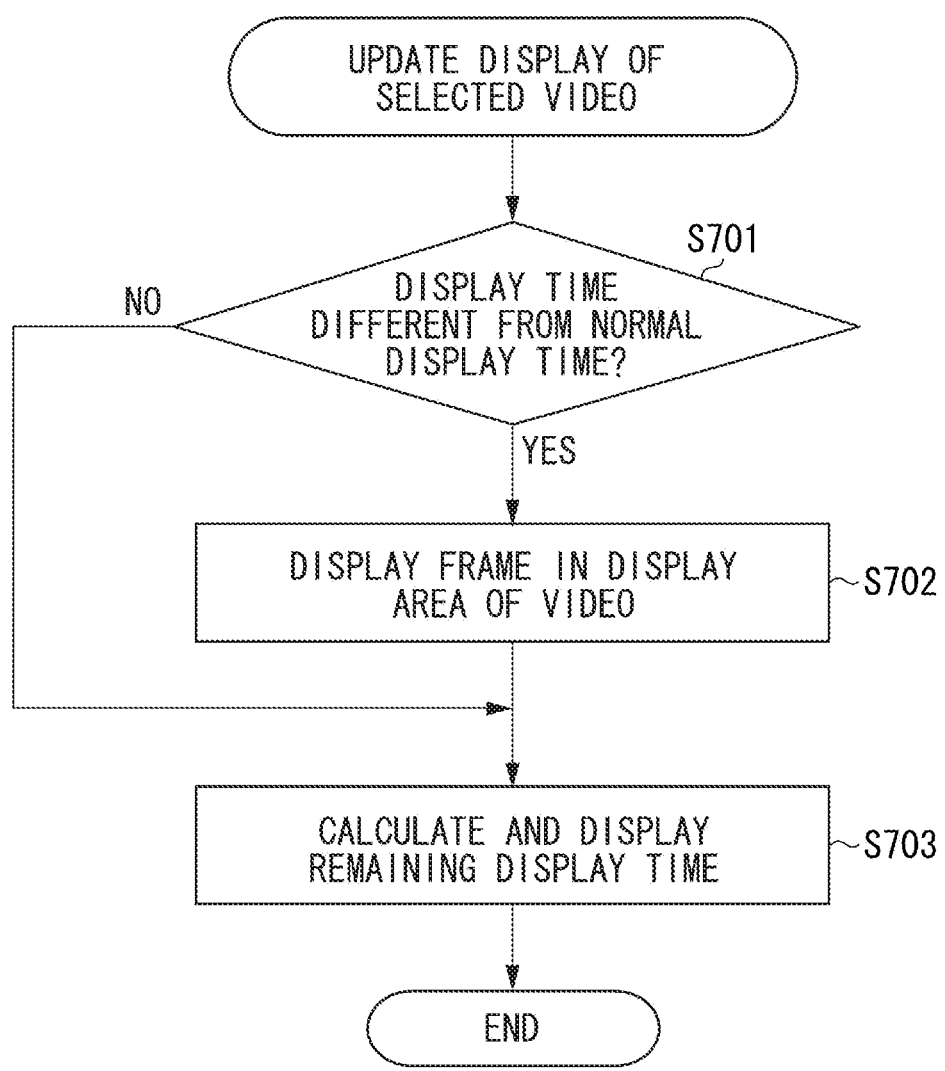
FIG. 7 is a flowchart illustrating processing for updating display of selected video according to one or more aspects of the present disclosure.

FIG. 7 is a flowchart illustrating processing for updating display of the selected video which is performed by the video display control unit 104. In step S701, the video display control unit 104 determines whether the display time set for the selected video is different from the normal display time. When the set display time is different from the normal display time (YES in step S701), then in step S702, the video display control unit 104 superimposes a frame onto the display area 113 of the video to highlight the display area 113 to make it easier to distinguish it from other video images. Alternatively, the video display control unit 104 may determine whether the display time set for the selected video is longer than the normal display time and, only when the set display time is longer than the normal display time, the video display control unit 104 may superimpose a frame onto the display time to highlight it.

In step S703, the video display control unit 104 calculates the remaining display time of all the selected video images, and superimposes the remaining display time onto the display areas 113. In this case, it is not always necessary to calculate the remaining display time of all the selected video images and superimpose a frame onto the display areas 113. The video display control unit 104 may calculate the remaining display time only for video images of which the display time is different from the normal display time and superimpose a frame onto the display areas 113. Further, instead of superimposing the remaining display time onto the display areas 113, the video display control unit 104 may display the remaining display time in the vicinity of the display areas 113.

In this case, the video display control unit 104 may change a display pattern, for example, by blinking the frames of the display areas 113 according to the remaining display time. Changing the video display pattern according to the remaining display time in this way makes it easier for the monitoring person to notice the timing of video display switching. Further, when it is determined that the level of visual recognition difficulty is high because a size of a person is small, the person area may be zoomed in.

According to the present exemplary embodiment, the monitoring space can be efficiently monitored by switching between lists of video images of a plurality of cameras. Further, by prolonging the display time for video images having high visual recognition difficulty of which it takes time for the monitoring person to confirm contents, the possibility of overlooking abnormal conditions and suspicious actions can be reduced.

Although, in the present exemplary embodiment, persons are picked out as monitoring targets, the monitoring targets are not limited thereto and they may be vehicles or animals. While in the present exemplary embodiment, one display unit 107 is divided into a plurality of display areas 113, when the display unit 107 includes a plurality of display devices, each display device may be used as one display area 113. Alternatively, video display according to the present exemplary embodiment may be performed by using one display area 113 or a part of a plurality of display areas 113 on the display unit 107.

A second exemplary embodiment will be described below. Regarding elements identical to those in the first exemplary embodiment, redundant descriptions thereof will be omitted. In the first exemplary embodiment, the display time is independently changed for each display area 113. When there are many video images taking pictures of the same place which shows high visual recognition difficulty, the display time of many video images may be prolonged all together and such video images may occupy the entire screen. The present exemplary embodiment is configured to determine whether a plurality of video images is taking the pictures of the same place to perform video display switching in a more efficient way.

Figure 8:
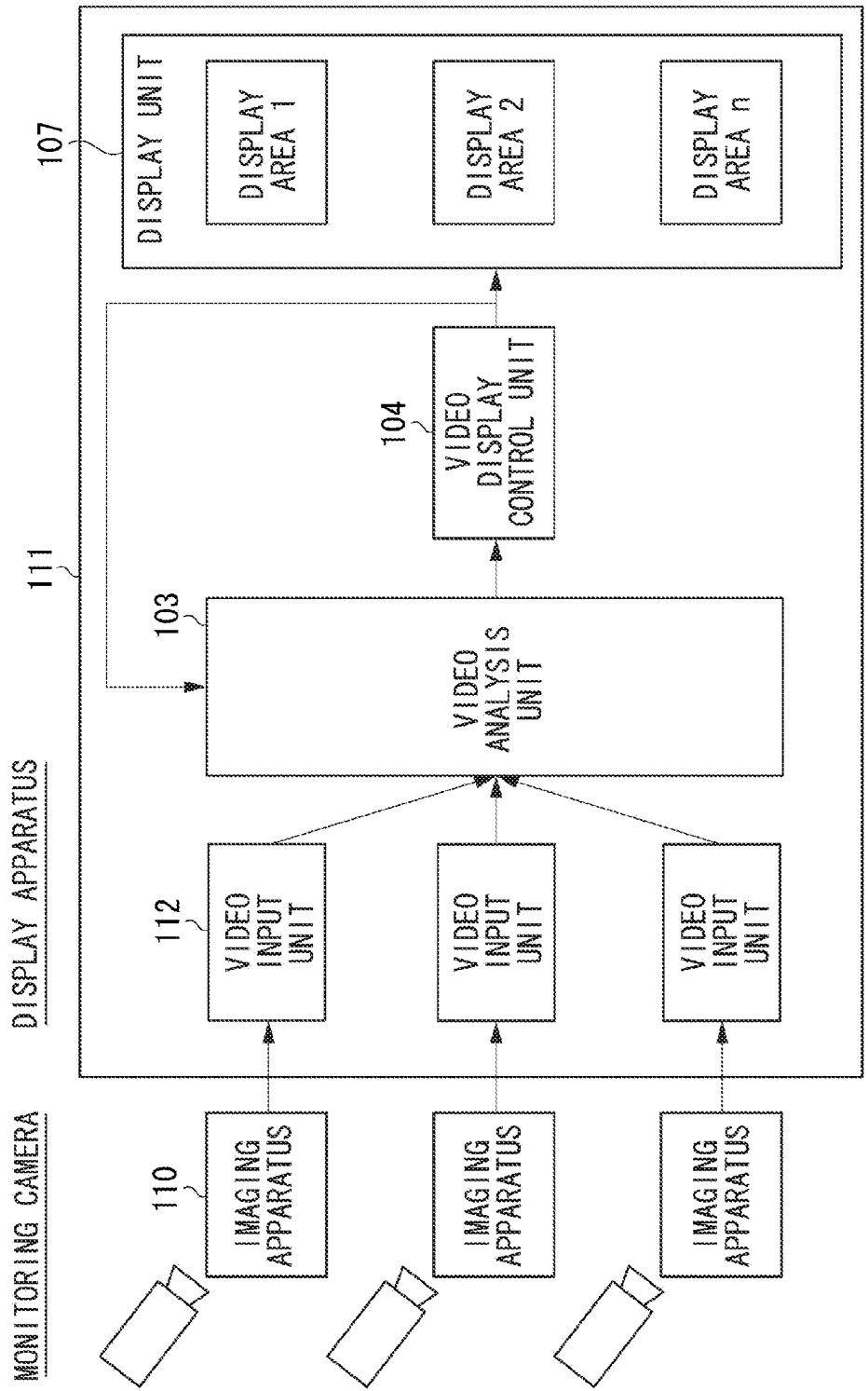
FIG. 8 is a block diagram illustrating a functional configuration according to one or more aspects of the present disclosure.

FIG. 8 is a block diagram illustrating a functional configuration of the display apparatus 111 according to the present exemplary embodiment. In the display apparatus 111 according to the present exemplary embodiment, similar to the first exemplary embodiment, the video input unit 112 inputs monitoring video captured by the externally installed imaging apparatus 110 such as a monitoring camera, and the video analysis unit 103 and the video display control unit 104 perform analysis processing on the input video. The present exemplary embodiment differs from the first exemplary embodiment in that such processing may not be necessarily performed in parallel on each display area 113 but may be collectively performed on a plurality of display areas 113.

Figure 9:
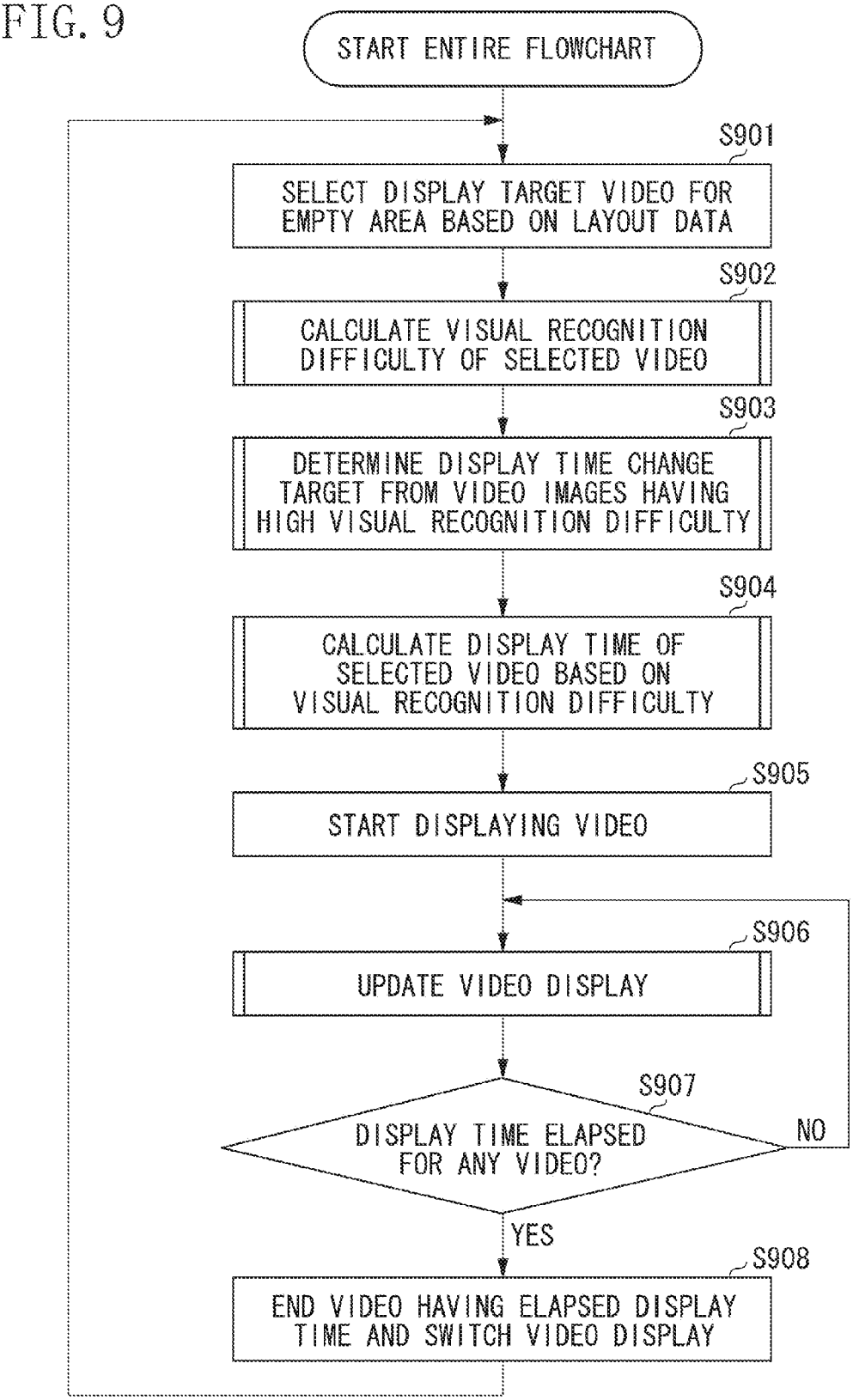
FIG. 9 is a flowchart illustrating overall control according to one or more aspects of the present disclosure.

FIG. 9 is a flowchart illustrating the overall processing of the display apparatus 111 according to the present exemplary embodiment. In step S901, based on the display layout data illustrated in FIG. 3B, the video display control unit 104 selects display target video for an empty area where no video is currently displayed. In this case, referring to the display layout data, the video display control unit 104 selects one video image for each display area 113 from among video images with respect to which an empty area is set as the video display position 303 according to the order of the display pattern 304.

In step S902, the calculation unit 115 of the video analysis unit 103 calculates the visual recognition difficulty of the video selected in step S901. The method for calculating the visual recognition difficulty according to the present exemplary embodiment can be implemented by performing the processing illustrated in FIG. 5 for the number of video images, and redundant description thereof will be omitted. Step S902 may be sequentially repeated for each video image or may be performed in parallel.

In step S903, the video analysis unit 103 selects a video image as a display time change target from among video images having high visual recognition difficulty as determined in step S902. Step S903 will be described in detail below with reference to FIG. 10.

In step S904, the video display control unit 104 calculates the display time of the selected video based on the visual recognition difficulty calculated in step S902. The method for calculating the display time according to the present exemplary embodiment will be described in detail below with reference to FIG. 11.

In step S905, the video display control unit 104 causes the display unit 107 to start displaying the selected video. In step S906, the video display control unit 104 causes the display unit 107 to update the displayed video. Since this processing can be implemented by performing the processing illustrated in FIG. 7 for the number of video images, and redundant description thereof will be omitted.

In step S907, the video display control unit 104 determines whether the display time has elapsed for any one of the displayed video images. When there is any video image of which the display time has elapsed (YES in step S907), then in step S908, the display unit 107 ends displaying the video of which the display time has elapsed, and switches the display target to the video to be selected next in step S901. On the other hand, when there is no video of which the display time has elapsed (NO in step S907), the processing returns to step S906. Then, the video display control unit 104 repeats the processing in step S906 and the subsequent steps. This flowchart is repetitively executed during execution of software and ended when software ends or the apparatus pauses.

Figure 10:
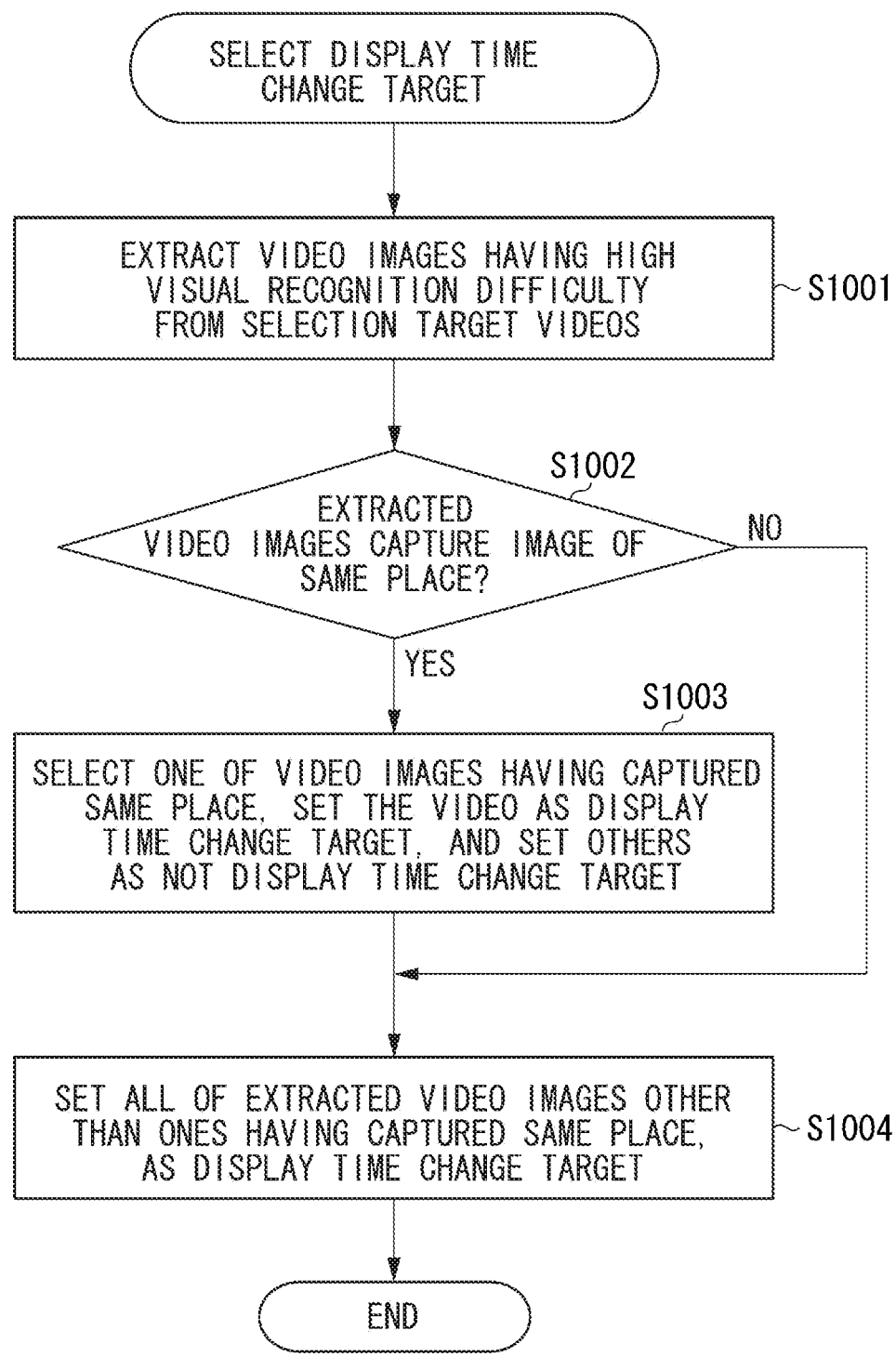
FIG. 10 is a flowchart illustrating processing for determining a display time change target according to one or more aspects of the present disclosure.

FIG. 10 is a flowchart illustrating in detail the processing for selecting a display time change target. In step S1001, the video display control unit 104 extracts a list of video images having high visual recognition difficulty as determined in step S902. In step S1002, the video display control unit 104 determines whether there is a combination of video images having captured images of the same place in a list of the video images extracted in step S1001. The video display control unit 104 may determine whether there is a combination of video images having captured the images of the same place, by using the imaging apparatus data illustrated in FIG. 3A at the time of camera installation. Alternatively, the video display control unit 104 may dynamically determine whether there is a combination of such video images by using the similarity of the image feature amount in each video image. When there is a combination of such video images having captured the images of the same place, then in step S1003, the video display control unit 104 selects one video image from among video images having captured the images of the same place as a display time change target. In this case, the video display control unit 104 is able to select a video image which it has determined as showing the highest benefit by using an evaluation index such as the face direction of a person within the video image and the brightness of the video image. For example, a video image in which the face is directed straight ahead is more beneficial than a video image in which the face is directed sideways or back. While, according to the present exemplary embodiment, the video display control unit 104 selects one video image from among video images having captured the images of the same place and selects the video image as a display time change target, the processing is not limited thereto. In processing according to the present exemplary embodiment, in step S1003, the video display control unit 104 may select more than one video image as long as the number of video images as display time change targets can be limited.

In step S1003, the video display control unit 104 sets unselected video images as not display time change targets.

In step S1004, the video display control unit 104 selects all of video images not having captured the images of the same place as display time change targets. However, when there are many video images with high visual recognition difficulty among video images not having captured the images of the same place, the video display control unit 104 is able to select video images in descending order of the visual recognition difficulty and limit the number of video images to be selected as display time change targets.

Information about display time change targets handled by this flowchart can be recorded in an additional column of the display control data illustrated in FIG. 3D.

FIG. 11 is a flowchart illustrating in detail the processing for calculating the display time according to the present exemplary embodiment. In step S1101, the video display control unit 104 selects one video image from among displayed video images. In step S1102, the video display control unit 104 initializes the display time of the video selected in step S1101 to the normal display time. In step S1103, the video display control unit 104 determines whether the selected video is a display time change target. When the selected video is the display time change target (YES in step S1103), then in step S1104, similar to the first exemplary embodiment, the video display control unit 104 increases or decreases the display time based on the visual recognition difficulty.

On the other hand, when the selected video is not the display time change target (NO in step S1103), the video display control unit 104 does not increase or decrease the display time. Then, the processing proceeds to step S1105. In steps S1105 and S1106, similar to the first exemplary embodiment, the video display control unit 104 determines whether the display time is greater than the predetermined maximum display time (upper limit) as illustrated in FIG. 3E. When the video display control unit 104 determines that the display time is greater than the maximum display time (upper limit) (YES in step S1105), then in step S1106, the video display control unit 104 corrects the display time of the processing target video to be the maximum display time (upper limit). When the video display control unit 104 determines that the display time is smaller than the minimum display time (lower limit) (YES in step S1105), then in step S1106, the video display control unit 104 corrects the display time of the processing target video to be the minimum display time (lower limit.

In step S1107, the video display control unit 104 determines whether processing is completed for all the video images selected in step S401. When there is an unprocessed video image, the processing returns to step S1101. Then, the video display control unit 104 repeats the processing in step S1101 and the subsequent steps.

According to the present exemplary embodiment, the screen can be prevented from being occupied for a prolonged period of time by many video images having captured the same place. This effect, in addition to the effect acquired in the first exemplary embodiment, enables more efficient monitoring.

A third exemplary embodiment will be described below. In the above-described exemplary embodiments, when a video image in a certain display area is displayed for a longer time than normal, the display timing of the video image to be displayed next in the display area will be delayed. To enable the user to easily notice a delay in display, processing for determining whether the previous video image has been displayed for a longer time than normal may be added when selecting a video image in step S401 according to the first exemplary embodiment and the display format of subsequent video images may be changed according to the result of the determination. For example, when the last video image is displayed for a longer time than normal, a frame or a mark may be added to the target display area 113.

To cancel a delay in display, it is also possible to change the display speed of the video image displayed at a delayed timing. In the above-described exemplary embodiments, the video image at the display start time is reproduced through streaming reproduction for all the video images. However, as for a video image displayed at the delayed timing, the video image to be presented at the original display timing may be reproduced at an increased reproduction speed compared with a normal speed. This configuration can prevent a video image displayed at the delayed timing from being overlooked and further enables catching up with the latest video image through high-speed reproduction. However, if the video image displayed at the delayed timing (for example, the video image of the monitoring camera 21 illustrated in FIG. 2B) has high visual recognition difficulty, there arises a problem that the displayed video image is hard to recognize simply by increasing the reproduction speed.

According to the present exemplary embodiment, if the video image displayed at the delayed timing according to the above-described exemplary embodiments is also a video image having high visual recognition difficulty, control is performed to ensure the display time of the video image. The present exemplary embodiment has approximately the same apparatus configuration as the first exemplary embodiment, description of the apparatus configuration will be omitted.

Similar to the control illustrated in FIG. 2B according to the first exemplary embodiment, the number of persons detected in the video of the monitoring camera 5 is equal to or greater than the predetermined number. Therefore, according to the present exemplary embodiment, the display time of the video having high visual recognition difficulty is prolonged three times as normal video. The present exemplary embodiment differs from the first exemplary embodiment in that the detection unit 114 of the video analysis unit 103 further detects person areas in the video of the monitoring camera 21 and counts the number of person areas in the video as the number of persons. When the number of persons detected in the video of the monitoring camera 21 is equal to or greater than a predetermined number, the display area 113 (display position on the display apparatus 111) of the video of the monitoring camera 21 is changed to prevent a delay in the display timing of the video of the monitoring camera 21.

According to a desirable example of the present exemplary embodiment, when changing the display area 113 of the video of the monitoring camera 21, a new display area 113 for displaying the video of the monitoring camera 21 is identified and the video is displayed therein. More specifically, the detection unit 114 of the video analysis unit 103 according to the present exemplary embodiment detects person areas from among the video images of the monitoring cameras 17 to 32, identifies a video image showing the least number of persons, and assigns the display area 113 of the identified video image to the display area 113 of the video image of the monitoring camera 21.

As a specific example, when switching video display for other than the video of the monitoring camera 5, the detection unit 114 identifies the number of persons in each of the video images of the monitoring cameras 17 to 32. As a result, when the number of persons identified in the video image of the monitoring camera 21 is equal to or greater than the predetermined number and the video image showing the least number of identified persons is the video image of the monitoring camera 31, the detection unit 114 displays, in the display area 113 for the video image of the monitoring camera 31, the video image of the monitoring camera 21 instead of the video image of the monitoring camera 31.

This control processing can ensure the display time of a video image having many persons or a video image having high visual recognition difficulty without causing a delay in display. In addition, according to the present exemplary embodiment, similar control processing can also be achieved by calculating the visual recognition difficulty instead of the number of persons detected in a video image.

According to the present disclosure, a display apparatus for simultaneously displaying video images of a plurality of monitoring cameras can prolong the video display time depending on elements which influence grasp of a video image, thus it becomes easier to grasp contents of the displayed video image.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, the scope of the following claims are to be accorded the broadest interpretation so as to encompass all such modifications and equivalent structures and functions.

This application claims the benefit of Japanese Patent Application No. 2016-005600, filed Jan. 14, 2016, which is hereby incorporated by reference herein in its entirety.

What is claimed is:

1. A display apparatus comprising:
   an input unit configured to input a plurality of video images captured by a plurality of imaging apparatuses;
   a display unit configured to display in a plurality of display areas the video images of a first group out of the plurality of the video images input by the input unit, and then to switch them to the video images of a second group out of the plurality of the video images to produce display in a plurality of the display areas;
   a detection unit configured to detect objects in each video image; and
   a control unit configured to, in a case where a number of the objects detected in respective video images of the first group by the detection unit is equal to or greater than a first predetermined number, control the display unit to make a display time of the video image of the first group longer than a predetermined display time for displaying other video images of the first group.

2. The display apparatus according to claim 1, wherein, when the number of the detected objects is equal to or smaller than a second predetermined number, the control unit makes the display time of the first video to be displayed in the display area shorter than the predetermined time.

3. The display apparatus according to claim 2, further comprising:
   a first calculation unit configured to calculate visual recognition difficulty of the first video based on a difference between the number of the detected objects and the first or the second predetermined number,
   wherein the control unit controls the display time based on the visual recognition difficulty.

4. The display apparatus according to claim 3, further comprising:
   a third calculation unit configured to calculate the display time of the first video based on the visual recognition difficulty.

5. The display apparatus according to claim 4, wherein, when the calculated display time is greater than a predetermined upper limit, the control unit sets the display time to the upper limit, and
   wherein, when the calculated display time is smaller than a predetermined lower limit, the control unit sets the display time to the lower limit.

6. The display apparatus according to claim 3, wherein the first calculation unit further calculates the visual recognition difficulty by using at least one of a density, moving speeds, image shakes, orientations, shield conditions of the objects, and a brightness of the first video.

7. The display apparatus according to claim 1, wherein, when an average value or a minimum value of sizes of the detected objects is equal to or smaller than a first predetermined size, the control unit makes the display time of the first video longer than the predetermined display time.

8. The display apparatus according to claim 1, wherein, when an average value or a minimum value of sizes of the detected objects is equal to or greater than a second predetermined size, the control unit makes the display time of the first video shorter than the predetermined display time.

9. The display apparatus according to claim 1, further comprising:
   a second calculation unit configured to calculate visual recognition difficulty of the first video based on a difference between an average value or a minimum value of sizes of the detected objects and a first predetermined size or a second predetermined size,
   wherein the control unit controls the display time based on the visual recognition difficulty.

10. The display apparatus according to claim 1, wherein, in the display area of the display unit for displaying the video image of which the display time is longer than the predetermined display time out of a plurality of the video images of the first group, the display area of an undisplayed video image of the second group of which the number of the objects detected by the detection unit is equal to or greater than a third predetermined number is changed to a different display area of the display unit and the undisplayed video image of the second group is displayed.

11. The display apparatus according to claim 10, wherein, as for a plurality of the first video images having captured the same place, the control unit limits the number of the first video images of which the display time is made longer than the predetermined time.

12. The display apparatus according to claim 10, wherein, in a case where each of the objects is a person, the detection unit detects a face direction of the person in each of a plurality of the first video images having captured the same place, and
   wherein, based on the face direction of the person, the control unit selects the first video image of which the display time is made longer than the predetermined time and makes the display time of the selected first video image longer than the predetermined display time.

13. The display apparatus according to claim 1, wherein the display unit highlights the display area of the first video image of which the display time is changed.

14. The display apparatus according to claim 1, further comprising:
   a fourth calculation unit configured to calculate a remaining display time based on the display time of the first video displayed in the display area and a time when the display unit started display,
   wherein the display unit displays information corresponding to the remaining display time in the display area of the first video of which the display time is changed.

15. A display method comprising:
   inputting a plurality of video images captured by a plurality of imaging apparatuses;
   displaying in a plurality of display areas the video images of a first group out of the plurality of the input video images, and then switching them to the video images of a second group out of the plurality of the video images to produce display in a plurality of the display areas;
   detecting objects in each video image; and
   Performing control, in a case where a number of the objects detected in respective video images of the first group is equal to or greater than a first predetermined number, to make a display time of the video image of the first group longer than a predetermined display time for displaying other video images of the first group.

16. A non-transitory computer-readable storage medium storing a program for causing a computer to execute a display method, the display method comprising:
inputting a plurality of video images captured by a plurality of imaging apparatuses;
displaying in a plurality of display areas the video images of a first group out of the plurality of the input video images, and then switching them to the video images of a second group out of the plurality of the video images to produce display in a plurality of the display areas;
detecting objects in each video image; and
Performing control, in a case where a number of the objects detected in respective video images of the first group is equal to or greater than a first predetermined number, to make a display time of the video image of the first group longer than a predetermined display time for displaying other video images of the first group.

* * * * *